July 11, 1972  J. LEBLOND  3,676,262
TIRE BUILDING DRUM HAVING A MAGNETIZED SURFACE
Original Filed April 1, 1968  10 Sheets-Sheet 1

INVENTOR.
JEAN LEBLOND
BY JACK POSIN
ATTORNEY

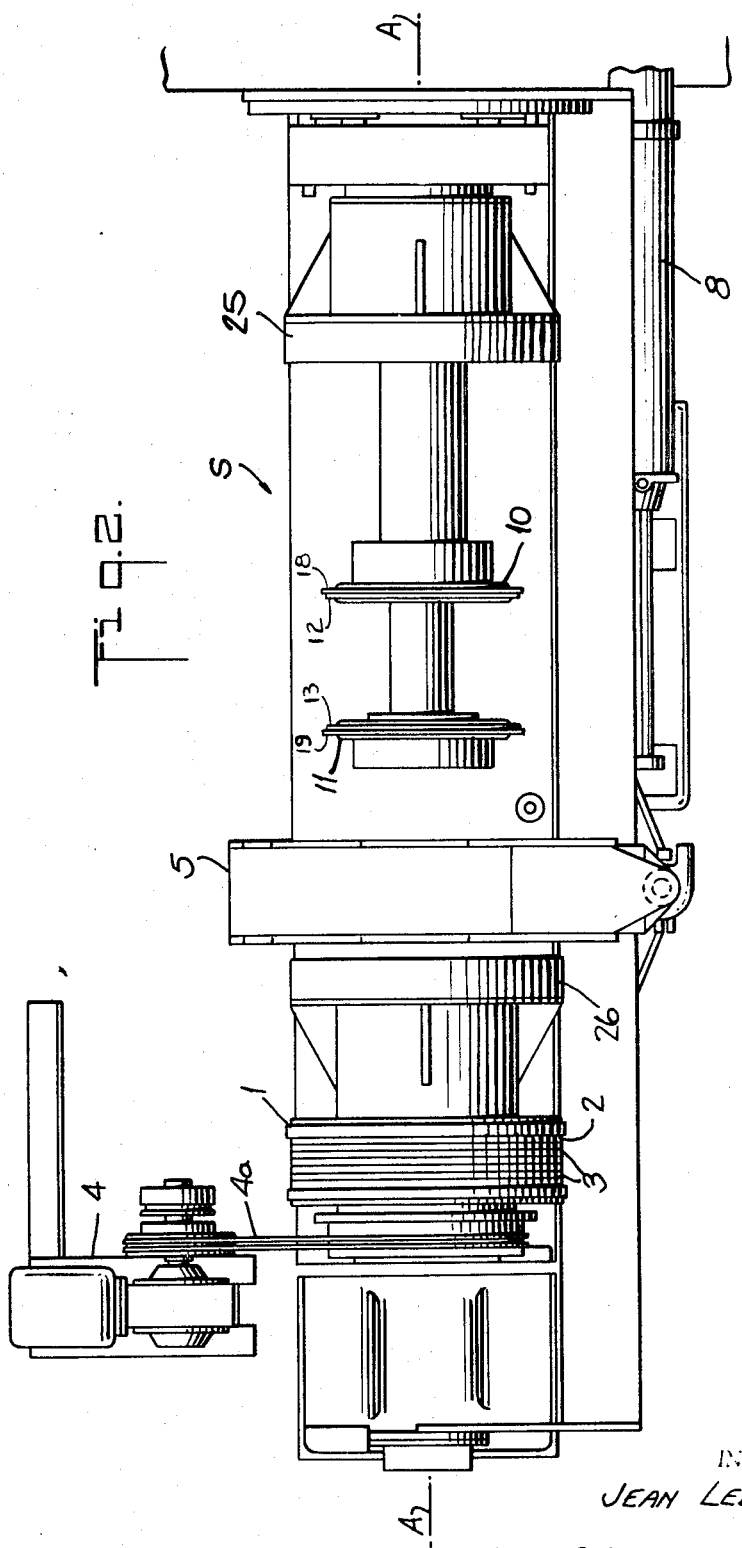

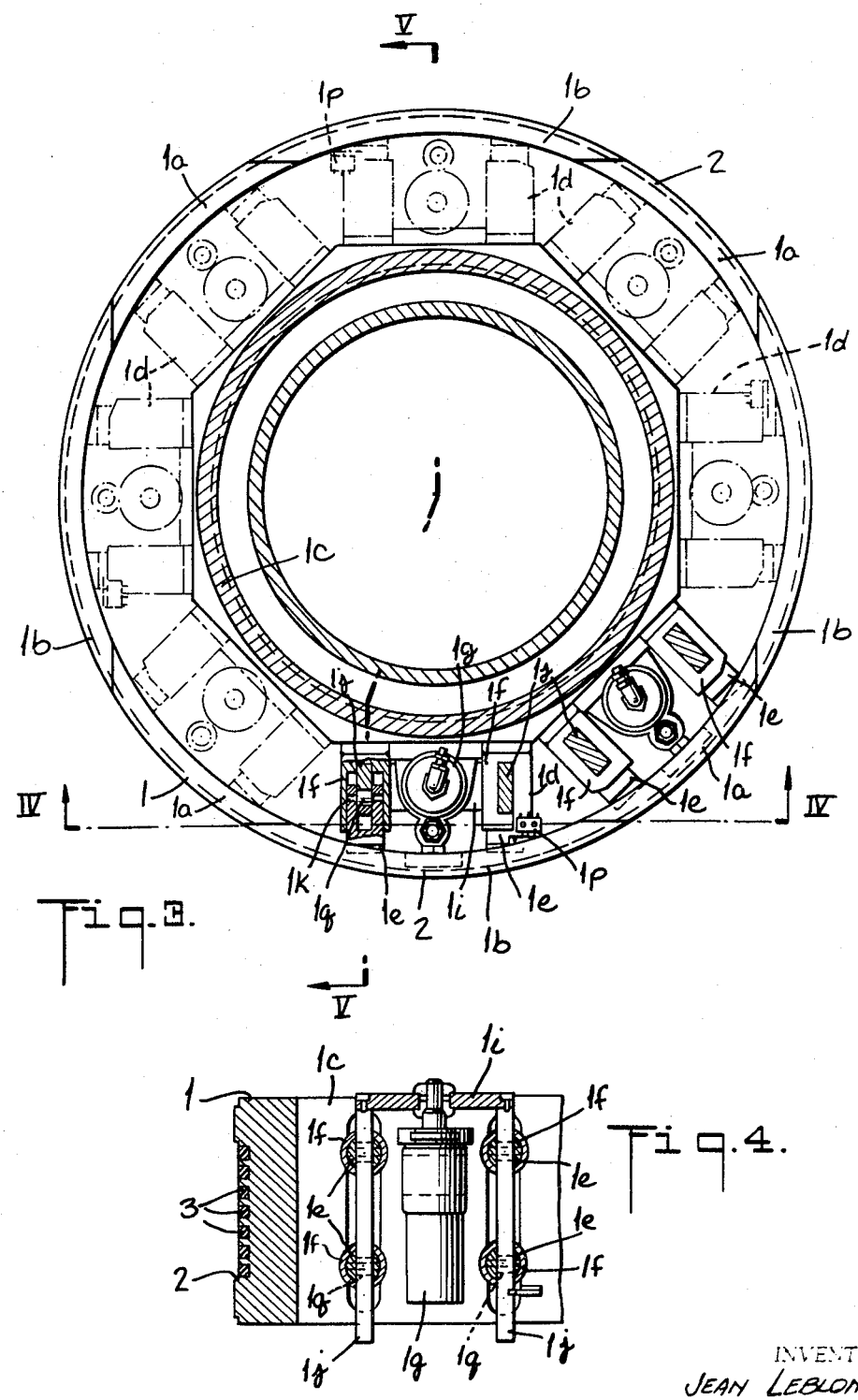

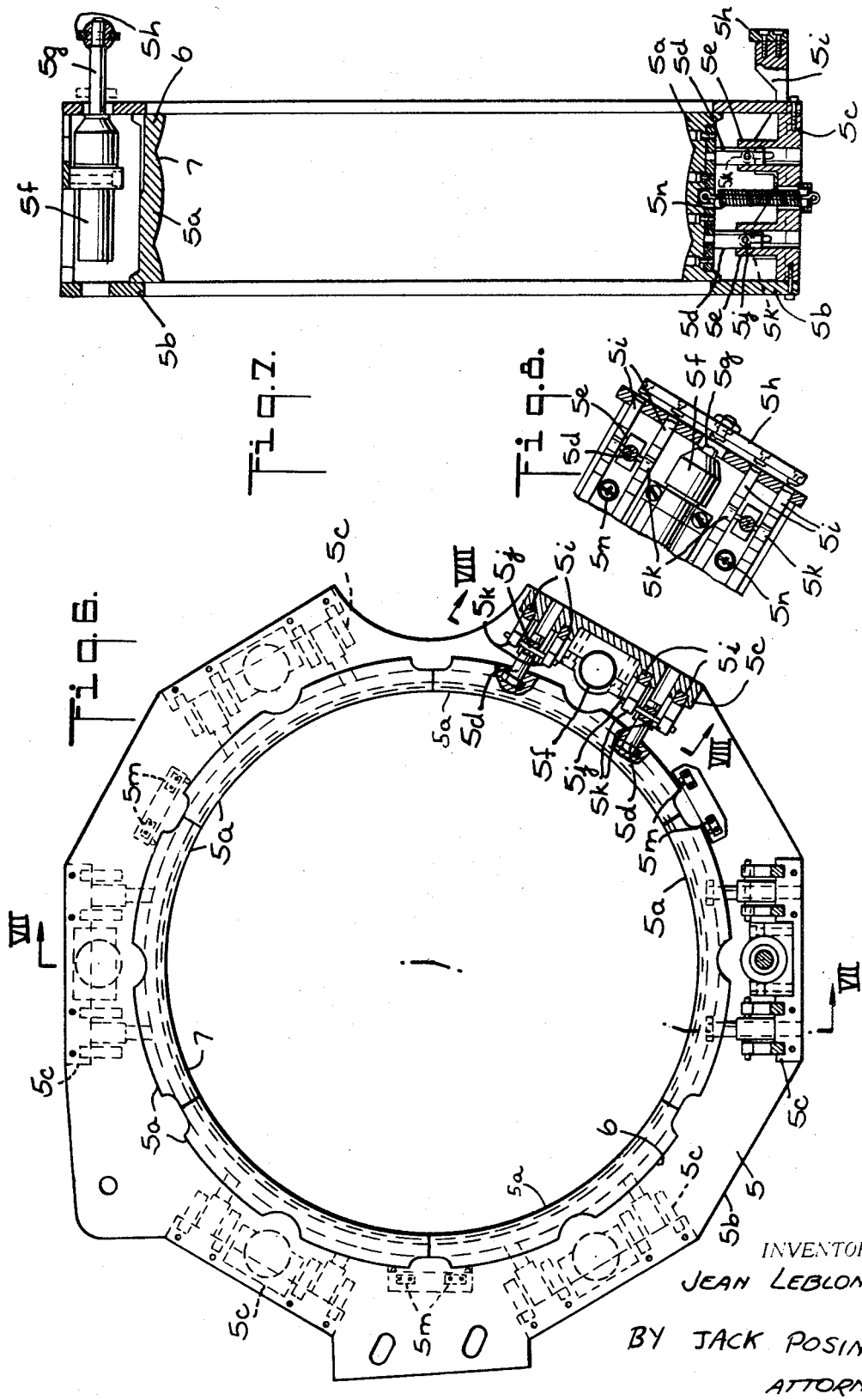

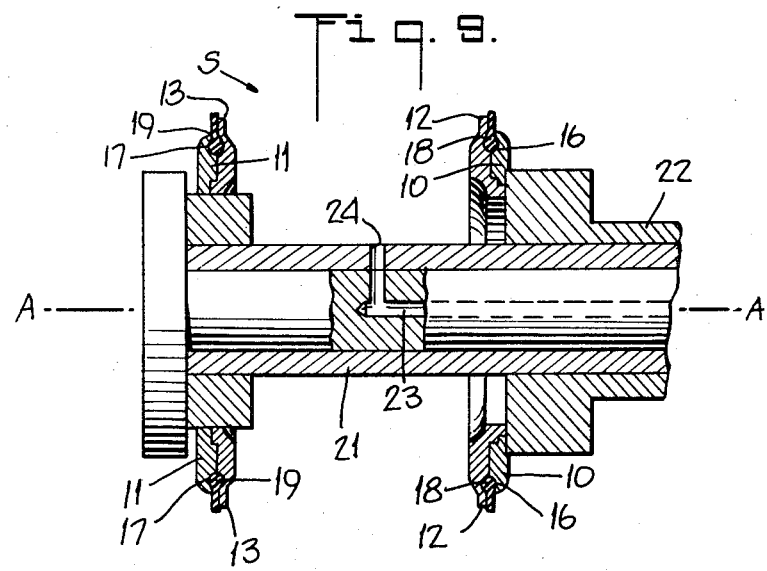
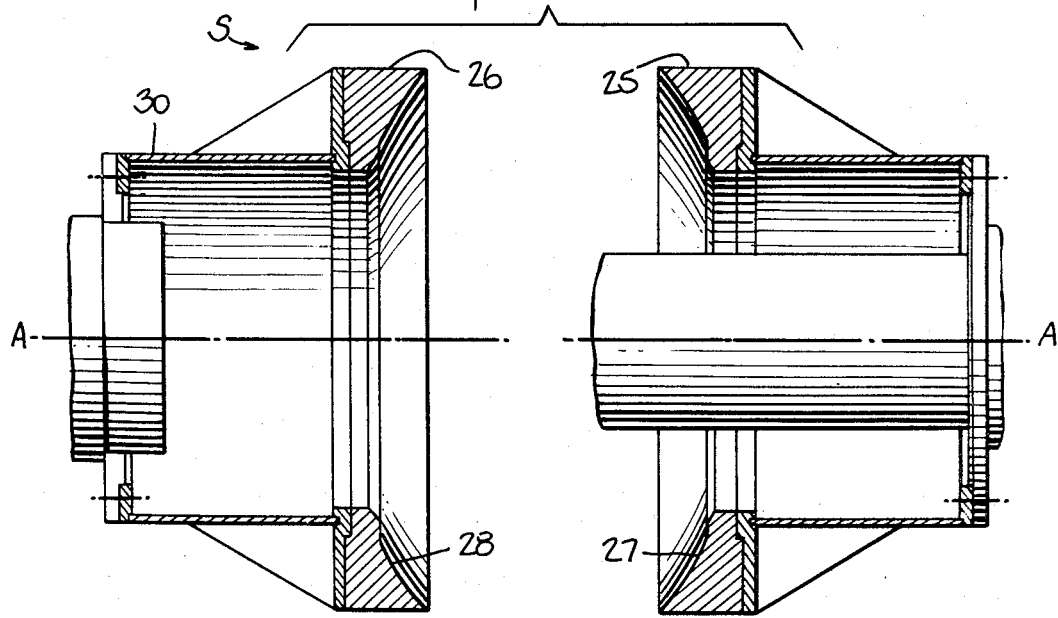

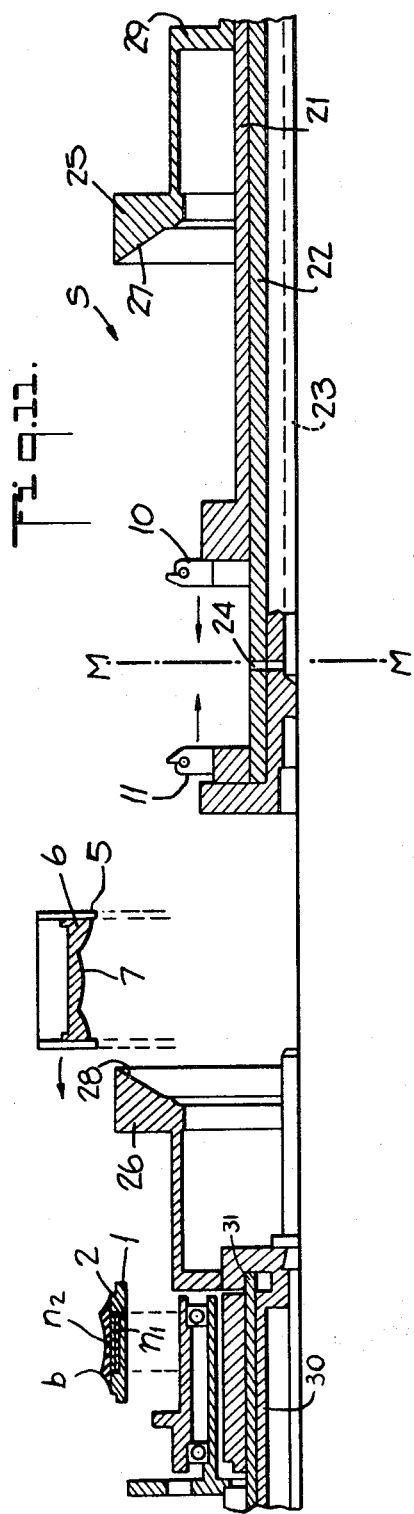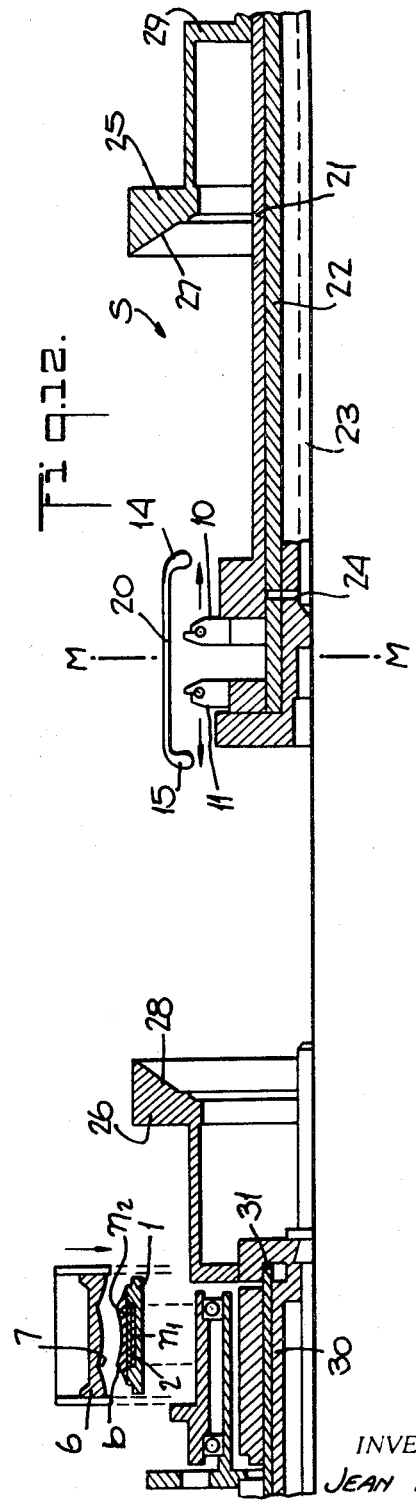

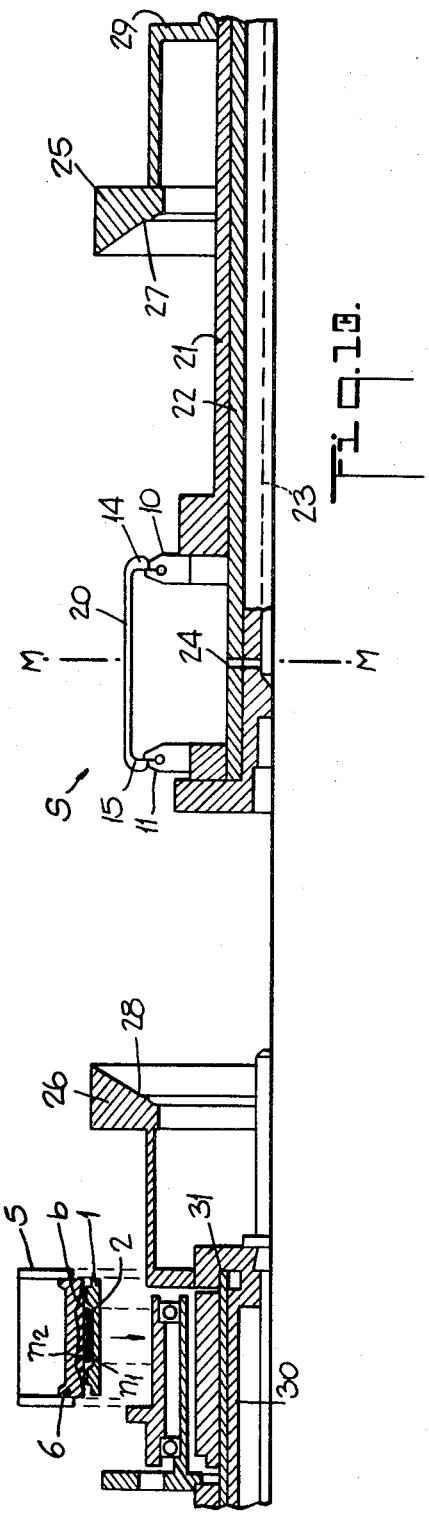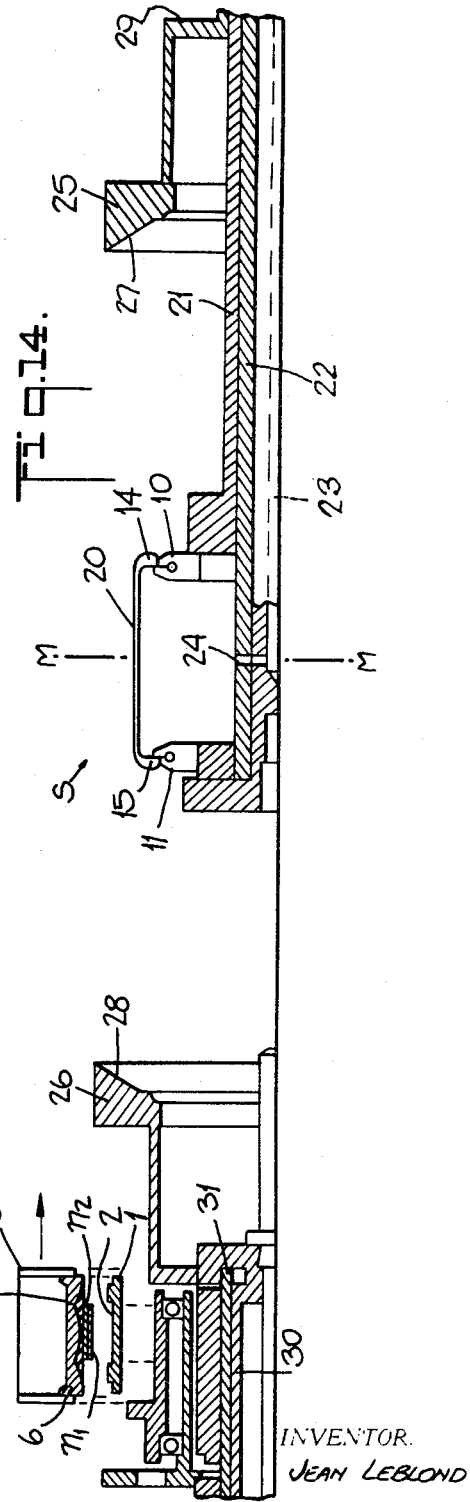

July 11, 1972 — J. LEBLOND — 3,676,262
TIRE BUILDING DRUM HAVING A MAGNETIZED SURFACE
Original Filed April 1, 1968 — 10 Sheets-Sheet 9
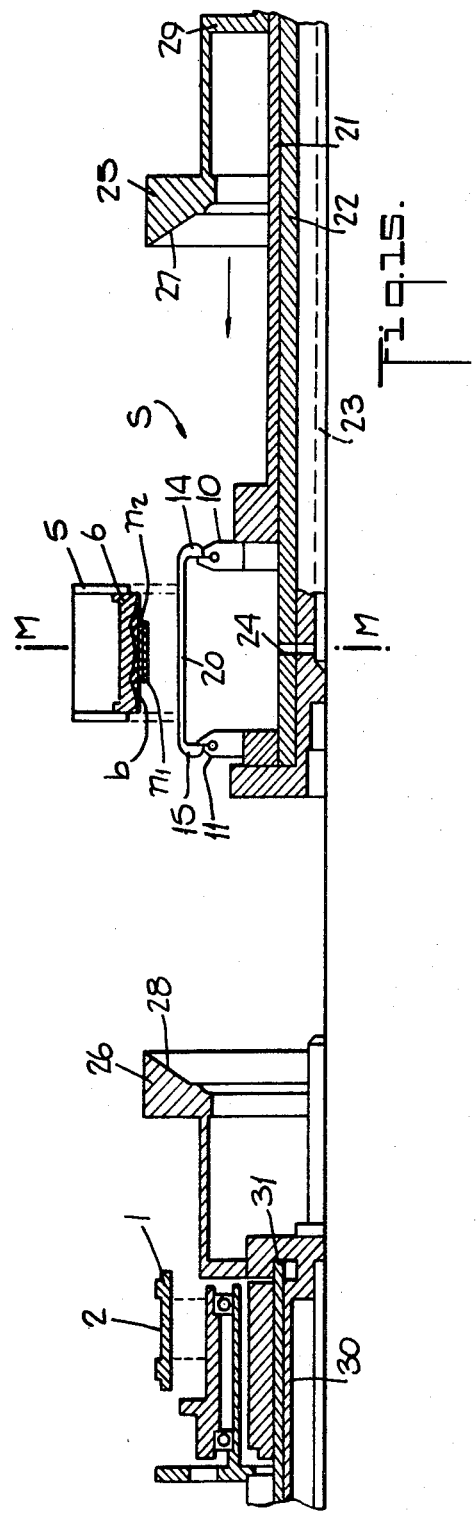
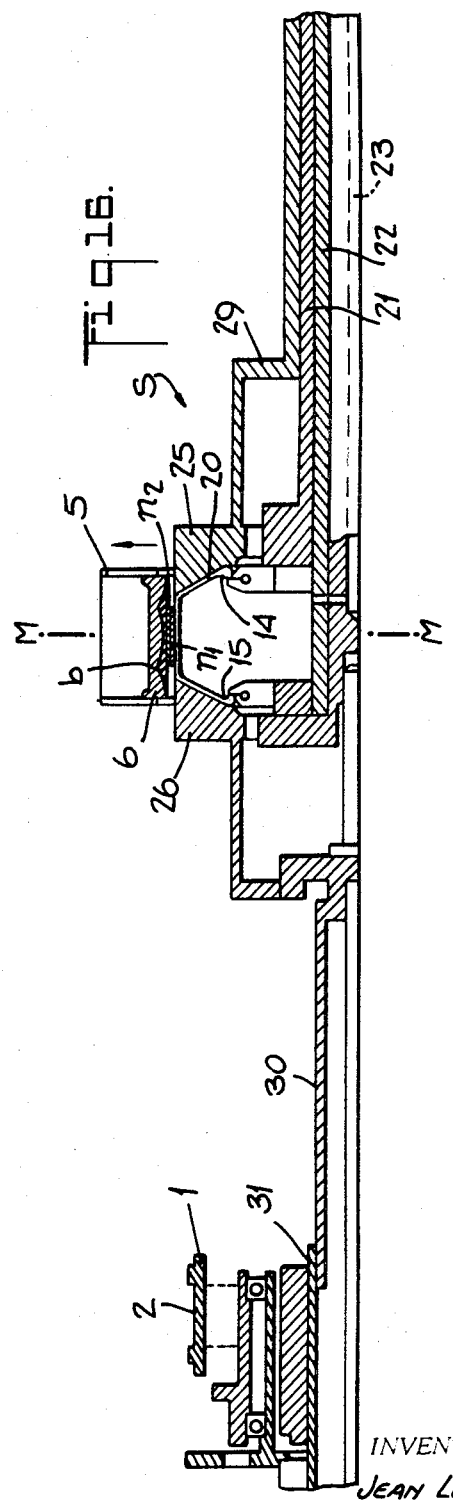
INVENTOR.
JEAN LEBLOND
BY JACK POSIN
ATTORNEY

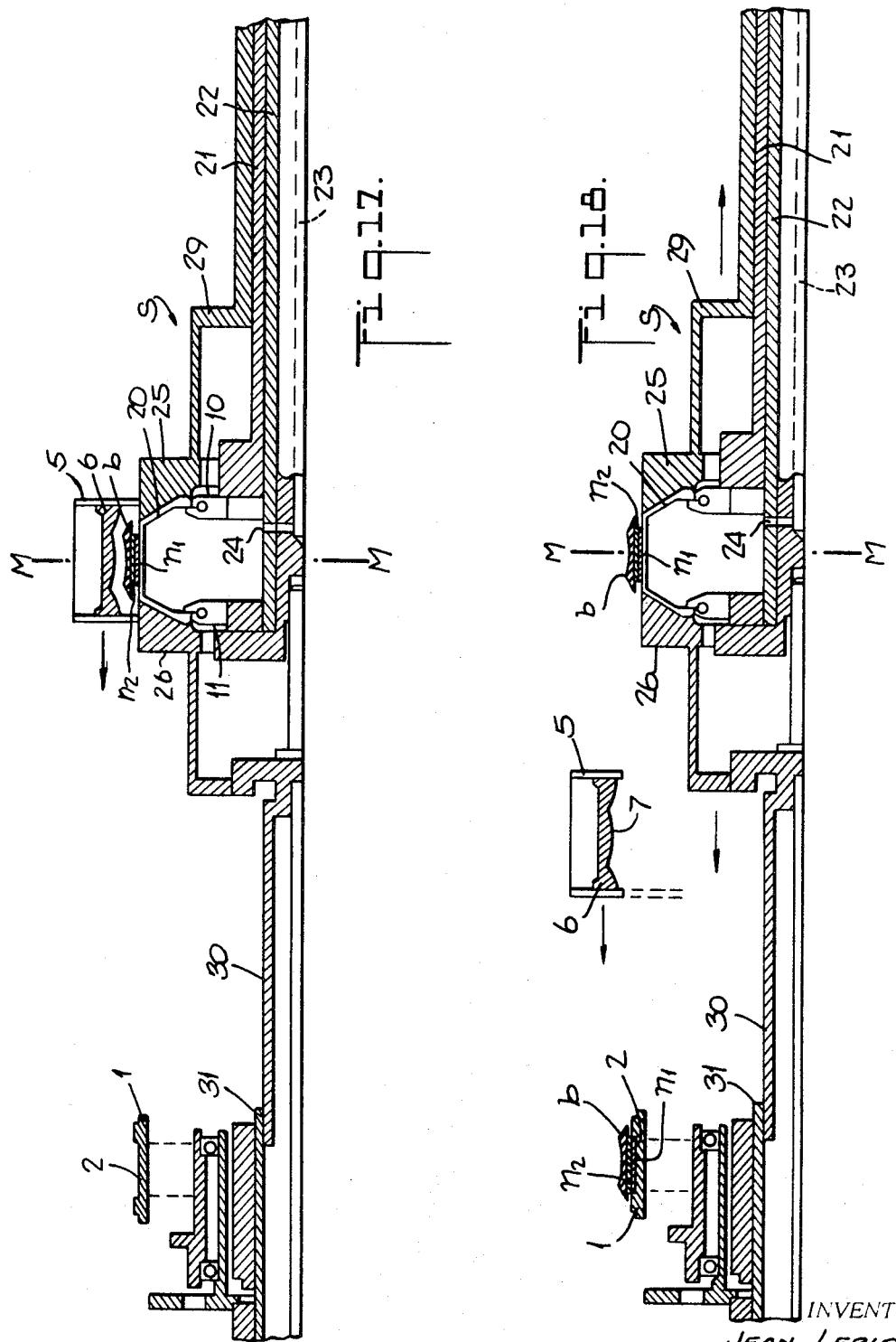

3,676,262
TIRE BUILDING DRUM HAVING A
MAGNETIZED SURFACE
Jean Leblond, Compiegne, France, assignor to Uniroyal
Englebert France S.A., Paris, France
Original application Apr. 1, 1968, Ser. No. 717,786.
Divided and this application Mar. 4, 1970, Ser.
No. 19,134
Claims priority, application France, July 6, 1967,
113,452
Int. Cl. B29h 17/16
U.S. Cl. 156—417                                        11 Claims

ABSTRACT OF THE DISCLOSURE

A tire building machine, comprising a radially expansible and contractable, breaker-tread assembly building drum having a magnetized outer surface for retaining building alignment of metallic cord breaker plies during building of the assembly, a pair of variably spaced tire carcass support and shaping discs coaxial with but spaced from the building drum and providing for direct inflation of a first stage carcass supported thereon, a radially expansible and contractable and axially movable transfer ring for transferring breaker-tread assemblies from the drum to carcasses on the shaping discs, and movable, conical, shaping rings engageable with the carcass sidewalls and limiting same to a predetermined pattern during inflation of the carcass.

---

The foregoing abstract is neither intended to define the invention disclosed in this specification, nor is it intended to be limiting as to the scope of the invention in any way.

This is a division of application Ser. No. 717,786, filed Apr. 1, 1968, now abandoned in favor of continuation application Ser. No. 118,551, filed Feb. 24, 1971.

This invention relates to an improved tire building machine and, more particularly, to a tire building machine having (1) an improved tire carcass shaping mechanism, (2) an improved building drum on which to form breaker-tread assemblies and (3) an improved transfer ring for transferring the breaker-tread asemblies from the building drum to tire carcasses mounted on the shaping mechanism.

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around and interconnecting axially spaced, parallel, coaxial, bead cores and (2) a layer of rubber sidewall stock on each sidewall area of the carcass, intermediate the eventual crown area thereof and the two bead areas thereof. Such a carcass is referred to herein as the "first stage carcass." During the second stage of building, the shape of the first stage carcass is changed from a cylinder to a toroid and one or more rubber covered cord breaker plies and a rubber tread slab are added to the crown portion of the carcass to form what is referred to herein as the "second stage carcass." The term "rubber" as used herein is intended to cover natural rubber, man-made rubber and rubbery materials. The term "cord" as used herein is intended to cover single and multiple strands, filaments, wires or cables of natural and synthetic textile materials such as cotton, rayon, nylon, polyester, glass fiber, and the like, metal and/or such other materials as may be used as reinforcements in pneumatic tires.

A number of machines have heretofore been developed which are utilized in building second stage carcasses in accordance with the general process referred to above (see, e.g. U.S. Pat. No. 3,125,482 to W. Niclas et al., dated Mar. 17, 1964). In these machines the cylindrical shape of the first stage carcass is changed into the toroidal shape of the second stage carcass on an inflatable drum. This drum usually comprises spaced, movable end plates and a cylindrical rubber diaphragm, the diaphragm and end plates together defining an inflatable chamber. Upon concurrent axial movement of the end plates toward each other and pressurization of the inflatable chamber, the first stage carcass mounted on the drum undergoes a change of shape to arrive at the shape of a second stage carcass.

Breaker-tread assemblies are fabricated in the aforesaid second stage carcass building machines by successively winding the various plies of each breaker and the tread layer about a radially expansible and contractable auxiliary building drum which is axially spaced from but coaxial with the aforementioned inflatable drum. Each breaker-tread assembly is then transferred from the outer surface of the auxiliary drum to the inner surface of a radially expansible and contractable transfer ring which is brought into a position surrounding the breaker-tread assembly. Thereafter, the breaker-tread assembly building drum is contracted to allow movement of the transfer ring, with the breaker-tread assembly therein, relative to both the auxiliary drum and the inflatable drum. Next, each breaker-tread assembly is carried to a position encircling the eventual crown area of the first stage carcass on the inflatable drum. Thereafter the inflatable drum is expanded and the crown area of the carcass thereon expands into pressurized contact with, and adheres to, the inner surface of the breaker-tread assembly to form the second stage carcass. The transfer ring is then expanded to release it from contact with the breaker-tread assembly and, finally, it is moved clear of the second stage carcass, allowing removal of the carcass from the inflatable drum following deflation of same.

Although commercially acceptable tires can be made on tire machines using the above process, the tires made on such machines tend to lack uniformity from one to another and have a high scrappage rate. This is caused, among other things, (1) by distortion and stretching of the various elements in the first stage carcass and in the breaker-tread assembly as these elements are manipulated on the conventional shaping drum and auxiliary drum, and (2) by misalignment of the first stage carcass and the breaker-tread assembly in connection with the transfer by the conventional transfer ring of the breaker-ring tread assembly from the auxiliary drum to the carcass on the shaping drum, and (3) by improper contacting and adhering of the outer surface of the first stage carcass to the inner surface of the breaker-tread assembly.

Accordingly, the primary objective of the present invention is to obviate the foregoing disadvantages by providing an improved tire building machine.

Another object of this invention is to provide a tire building machine having an improved tire carcass shaping mechanism therein for more precisely controlling the changing of shape that a first stage carcass undergoes in becoming a second stage carcass.

A further object of this invention is to provide a tire building machine having an improved radially expansible and contractable drum therein for uniformly building breaker-tread assemblies with great precision.

Yet another object of this invention is to provide a tire building machine having an improved transfer ring therein for precisely and uniformly transferring breaker-tread assemblies from a building drum to tire carcasses mounted on a shaping mechanism.

Further objects and advantages of this invention will become apparent as the following description proceeds.

Briefly stated and in accordance with one embodiment of this invention, a tire building machine is provided, comprising a radially expansible and contractable breaker-tread assembly building drum having means thereon for retaining the alignment of the breaker elements relative to the drum during building of the assembly, a variable width shaping mechanism for supporting a first stage tire carcass in the machine, the mechanism providing for di-direct inflation and expansion of the supported carcass, a radially expansible and contractable and axially movable transfer ring for transferring the breaker-tread assembly from the drum to the carcass on the shaping mechanism, and movable conical means engageable with each of the sidewalls of the cacass during expanion of the same for limiting such expansion to a predetermined pattern.

While the specification concludes with claims particularly pointing out and distinctly claiming the subject matter regarded as this invention, it is believed that the invention will be better understood from the following description, taken in connection with the accompanying drawings in which:

FIG. 2 is a plan view of the machine shown in FIG. 1;

FIG. 3 is an enlarged end elevation view, partly in section, taken along the line III—III of FIG. 1, showing the breaker-tread assembly building drum;

FIG. 4 is a plan view, partly in section, of one of a number of movable segments in the drum, taken along the line IV—IV of FIG. 3;

FIG. 6 is an enlarged end elevation view, partly in section, taken along the line VI—VI of FIG. 1, showing the transfer ring;

FIG. 7 is a sectional elevation view of the transfer ring, taken along the line VII—VII of FIG. 6;

FIG. 8 is a plan view, partly in section, taken along the line VIII—VIII of FIG. 6, showing the operating mechanism for one of a number of movable segments of the transfer ring;

FIG. 9 is an elevation view, partly in section, of the carcass supporting portion of the tire carcass shaping mechanism;

FIG. 10 is an elevation view, partly in section, of the sidewall shaping portion of the tire carcass shaping mechanism; and FIGS. 11 through 18 are synoptic views of the machine of FIG. 1, showing the various elements of the machine in different relative positions of operation in connection with the processing of a first stage tire carcass into a second stage tire carcass.

GENERAL DESCRIPTION OF MACHINE

Figure 1:
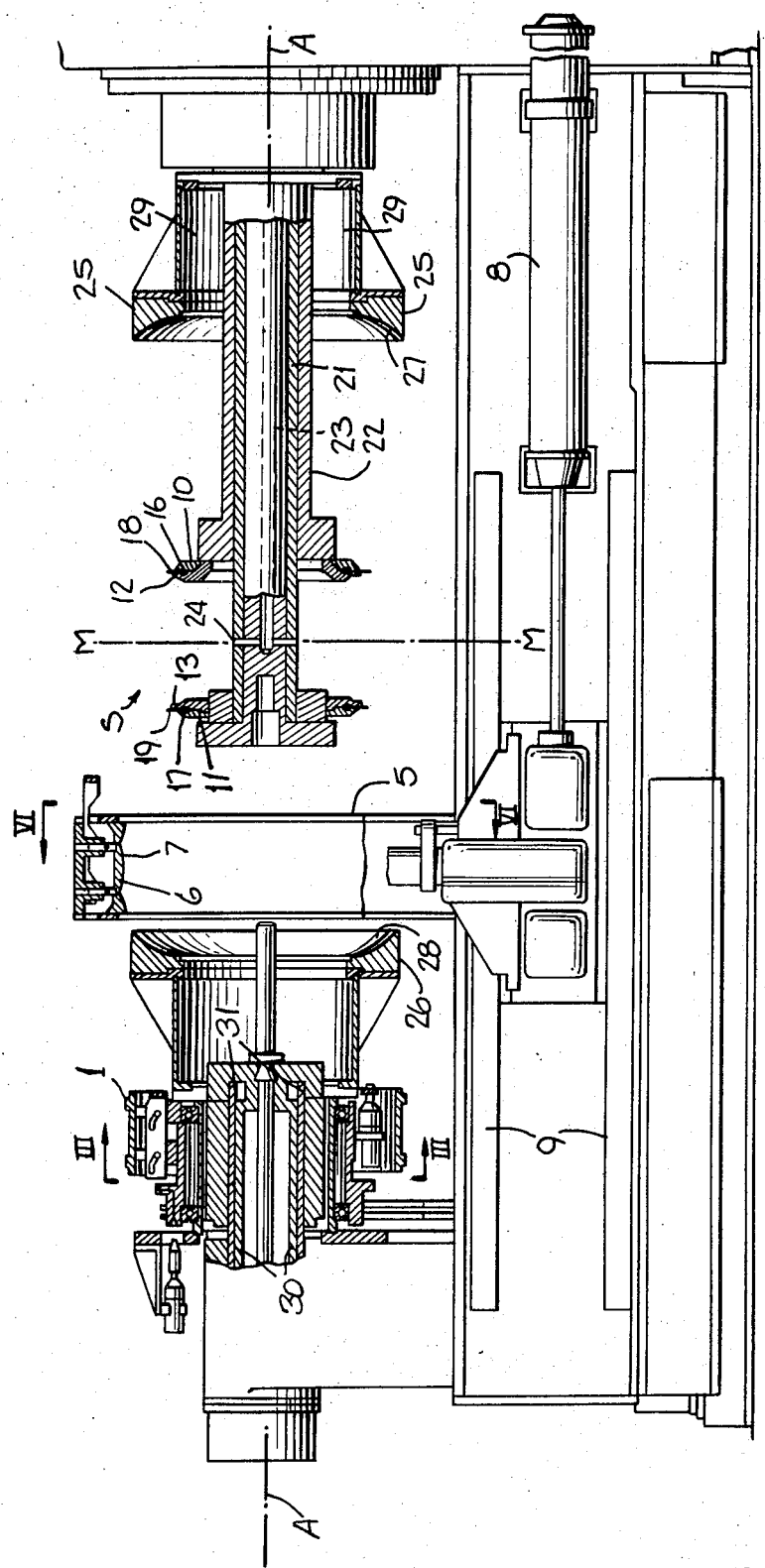
FIG. 1 is a side elevation view, with parts cut away for clarity, of a tire building machine embodying the present invention.

Referring now to FIGS. 1 and 2, a tire building machine in accordance with one embodiment of this invention has been illustrated. The tire building machine generally comprises a radially expansible and contractable building drum 1 upon which breaker-tread assemblies are formed. These assemblies are formed in a recessed or grooved outer surface 2 of the drum which is provided with a plurality of 8 circumferentially extending grooves 3 (FIG. 2) filled with a magnetic elastomeric material, such as barium ferrite loaded, magnetized, cured rubber described in U.S. Pat. No. 2,999,275 to W. S. Blume, Jr. The magnetic elastomeric material serves to attract the metallic cords of the breaker to the drum 1 to aid in maintaining precise alignment of the breaker relative to the drum. A driving means 4 is provided, including an electric motor, a suitable reduction gear and an electromagnetic clutch means, for rotating the drum 1 via suitable drive belts 4a.

A transfer ring 5 is provided for transferring the breaker-tread assemblies formed on drum 1 to a tire carcass shaping mechanism, shown generally at S in FIGS. 1 and 2. The transfer ring 5 is provided with a radially expansible and contractable ring 6 (FIG. 1), the contour of the inner surface 7 of which conforms generally to the contour of the outer surfaces of the treads in the breaker-tread assemblies formed on building drum 1. The transfer ring 5 is shifted from the position shown in FIG. 1 to a position in vertical alignment with the building drum 1 by means of a hydraulic power cylinder 8. The piston rod of cylinder 8 is connected to a sliding block which moves in a guide 9, the sliding block being rigidly interconnected with and serving as the support for the transfer ring 5.

As will be described in greater detail hereinafter, transfer ring 5 is provided with suitable means for radially contracting its ring 6 into contact with the outer surface of a breaker-tread assembly on the building drum 1. In building a tire, after the ring 6 is moved radially inwardly into contact with a breaker-tread assembly, the building drum 1 is radially contracted to transfer sole control over the breaker-tread assembly to the transfer ring 5. Thereafter, this ring is axially shifted to the right, as viewed in FIG. 1, into vertical alignment with the median plane M—M of a first stage carcass mounted on end plates or discs 10 and 11 comprising the carcass supporting portion of the tire carcass shaping mechanism S.

Next, the sidewall shaping portions of the tire shaping mechanism S, comprising conical shaping rings 25 and 26, are moved toward the median plane M—M, into contact with the bead portions of the carcass on the discs 10 and 11. At this time, the interior of the carcass on the discs 10 and 11 is inflated with fluid under pressure and the shaping rings 25 and 26 and the discs 10 and 11 are axially moved closer to the median plane M—M to cause the first stage carcass to expand into contact both with the interior of the breaker-tread assembly, carried in transfer ring 5 and with the interiors of the shaping rings 25 and 26. The conical configuration of the interior of the shaping rings 25 and 26 confines the expansion of the carcass to a predetermined pattern, which pattern causes the shoulder areas of the carcass to be forced against the interior of the shoulder areas of the breaker-tread assembly to provide an improved junction between the carcass and the assembly. After the breaker-tread assembly and the carcass are in good adhering contact with one another, the pressure in the carcass is released, the shaping rings 25 and 26 are moved axially away from the carcass, the ring 6 of the transfer ring 5 is expanded radially outward to free it from contact with the tread portion of the breaker-tread assembly, the transfer ring 5 is shifted axially out of alignment with the plane M—M, clear of the carcass, and the discs 10 and 11 are moved closer together to break the adhesion of the carcass thereto. Thereafter, the carcass is removed from the machine and the machine is returned to the condition shown in FIG. 1, ready to be recycled for the building of a new breaker-tread assembly and for the application of this new assembly to a new first stage carcass.

The building drum 1

Figure 5:
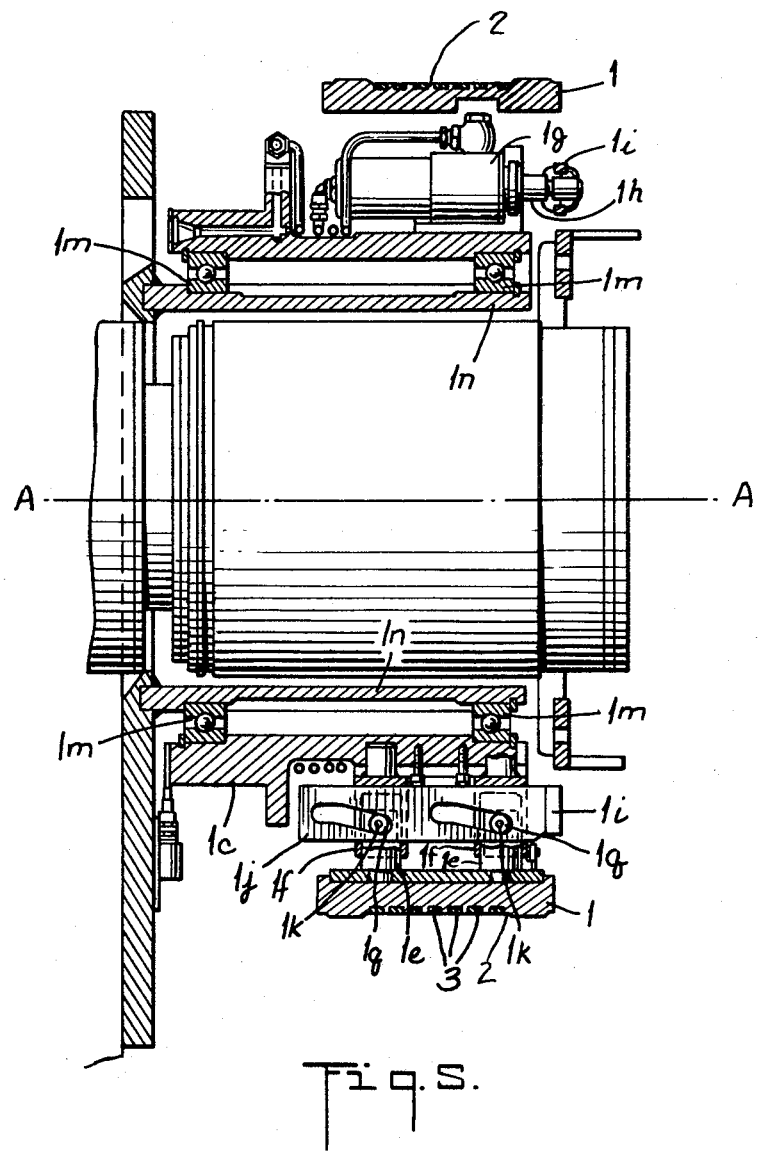
FIG. 5 is a sectional elevation view of the drum, taken along the line V—V of FIG. 3.

Referring more particularly to FIGS. 3 through 5, along with FIGS. 1 and 2, the building drum 1 will now be considered in greater detail. The drum 1 comprises a plurality of small and large arcuate segments or elements 1a and 1b, respectively, which abut one another in an end-to-end alternating circumferential sequence defining the outer cylindrical periphery of the drum, there being four such small elements 1a and four such large elements 1b in the embodiment shown. When these two groups of elements are joined together in the manner shown in FIG. 3, their resulting outer surface is generally cylindrical in shape and is provided with the groove 2, which groove is shown more clearly in FIG. 4.

The building drum 1 is shown in its expanded condition in FIGS. 1 through 5. In order to contract or collapse the building drum to facilitate removal of a completed breaker-tread assembly, the various small segments 1a (FIG. 3) are first shifted radially inward in a predetermined amount by segment moving mechanisms which will be described in greater detail hereinafter, and then the large segments $1b$ are similarly shifted radially inward in a predetermined amount. The inward movement of the segments $1a$ and $1b$ reduces the circumferential outline of the drum in an amount sufficient to allow the breaker-tread assemblies formed on the building drum 1 to clear the drum when they are shifted axially by the transfer ring 5.

The segments $1a$ and $1b$ are moved between their radially expanded and radially contracted positions by a plurality of segment moving mechanisms or means $1d$ which are fixedly carried about a hub $1c$, there being one mechanism $1d$ in radial alignment with each of the eight segments $1a$ and $1b$. The eight mechanisms $1d$ are similar to one another and a description of one will suffice for all.

The segment moving mechanisms $1d$ each comprise a group of four identical cylindrical, movable slides $1c$ which are fastened to one or another of the various segments $1a$ and $1b$. The slides $1c$ are lined up by twos in each of two planes which are parallel and symmetrical with respect to the median plane of each segment moving mechanism $1d$, the median plane of each segment moving mechanisms $1d$ being radially disposed with respect to the axis of the building drum 1. The slides $1c$ move axially in corresponding tubular guides $1f$ which are fastened to the hub $1c$.

Each segment moving mechanism $1d$ is also provided with a power cylinder $1g$ whose axis is parallel to the axis of the drum 1, the cylinder $1g$ being suitably fastened to the hub $1c$. The cylinder $1g$ operates a piston rod $1h$, the free end of which is connected to and drives a coupling bar $1i$ (FIG. 4). The coupling bar $1i$ is connected to and drives two identical double-acting cams or ramps $1j$, each ramp having two pairs of suitably chosen cam surfaces thereon (see FIG. 5). The ramps $1j$, which are parallel and symmetrical with respect to the median plane of the mechanism $1d$, each pass through openings in two longitudinally aligned guides $1f$, as well as through the slides $1c$ movable in such guides. Each slide $1c$ carries a roller $1q$ intermediate the ends of a shaft $1k$ fixed thereto, which shaft is perpendicular to the planes of the ramps $1j$. The rollers $1q$ coact with the parallel camming surfaces on the double acting ramps $1j$ in moving the segments $1a$ and $1b$ radially inward and outward.

When the ramps $1j$ are simultaneously moved upon actuation of the power cylinder $1g$, the slides 1 are reciprocated as a result of the displacement of the rollers $1q$, causing the various segments $1a$ and $1b$ to move radially of the axis A—A of the drum 1. As may be seen more clearly in FIG. 5, upon movement of piston rod $1h$ out of power cylinder $1g$, the ramps $1j$ move to the right, causing the segments $1a$ and $1b$ of drum 1 to move radially inward and causing the drum to assume its contracted condition. Similarly, upon movement of piston rod $1h$ into power cylinder $1g$ when the drum 1 is in its contracted condition, the segments $1a$ and $1b$ move radially outward, causing the drum to assume its expanded condition. The ramps $1j$ are said to be double acting in view of the fact that the radially inner cam surfaces of the ramps cooperate with rollers $1q$ in moving the drum segments outward, while the radially outer cam surfaces of the ramps cooperate with rollers $1q$ in moving the drum segments radially inward.

In order to avoid interference and binding during movement of the small and large segments $1a$ and $1b$ between their inner and outer positions, those of the cylinders $1g$ which control the movements of small segments $1a$ are actuated prior to actuating those of the cylinders $1g$ which control the large segments $1b$ when the drum 1 is to be contracted. Conversely, when the drum 1 is to be expanded, those of the cylinders $1g$ which control the large segments $1b$ are actuated prior to actuating those of the cylinders $1g$ which control the small segments $1a$. Alternatively, the profiles of the camming surfaces on the ramps $1j$ can be cut in such a way as to achieve the foregoing effect in connection with simultaneous operation of all of the cylinders $1g$.

The operation of the various elements of the drum 1 may be controlled in a well known manner through the use of conventional electrical and fluid control circuitry which need not be described in detail herein, it being sufficient to point out that suitable limit switches are provided for sensing purposes, such as switches $1p$ in the various drum segment moving mechanisms $1d$. The latter switches are placed in positions at which they are actuated by the various segments $1a$ and $1b$ when these segments move into or out of their contracted positions.

As indicated earlier, the drum 1 is rotated about its axis A—A by the driving means 4 and belts $4a$ (FIG. 2). In order to facilitate such rotation, drum 1 is mounted on appropriate bearings $1m$ (FIG. 5) which are carried on a shaft $1n$ that is coaxial with axis A—A.

Referring to FIG. 11, in conjunction with FIGS. 1 through 5, the manner in which a breaker-tread assembly is built up on the building drum 1 will now be considered. The breaker-tread assembly comprises a first or inner breaker ply $n1$, a second or outer breaker ply $n2$ and a tread $b$. The plies $n1$ and $n2$ preferably comprise rubber covered cords of a magnetic material such as steel. Also, they will have been previously cut to the desired length and width so as to have suitable overlap when wrapped about drum 1 and so as to fit properly into the grooved surface 2 of the drum.

The first breaker ply $n1$ may be applied to the grooved surface 2 of the drum 1 by hand or, preferably, by a suitable known ply applicator device. Such known device is usually power driven and frictionally drives the building drum 1 to effect application of the ply thereto, the drum being disengaged from its own drive motor by the electromagnetic clutch of the driving means 4 during the time it is driven by such a device. As indicated earlier, the transfer of the ply $n1$ to the drum is enhanced due to the attraction of the metal cords in the ply $n1$ to the magnetic flexible material in the grooves 3 of the drum, and the ply $n1$ is wound about the grooved surface 2 of the building drum with constant tension and proper alignment.

The second breaker ply $n2$ may be applied to the drum 1 by hand or by means of the same applicator device as used in connection with ply $n1$. In this case, however, the ply $n2$ is applied atop the previous ply $n1$ with its cords reversed from those of ply $n1$ so that the cords of the two plies form crossing angles which are preferably equal but opposite with respect to the median plane of the breaker-trend assembly.

It is apparent that, if desired, additional breaker plies can be added in the foregoing manner to the plies already assembled on the grooved surface 2 of drum 1. When the desired number of breaker plies, in this case two, have been applied to the building drum, a previously prepared rubber tread $b$ is added thereto. The tread $b$ should be provided with a predetermined shape and dimensions as required for the type and size of tire being built. The tread $b$ should preferably be wound with constant tension atop plies $n1$ and $n2$ on the drum, either, manually or by a suitable known applicator device, in such a way that its median plane coincides with the median planes of the drum and the plies.

The building drum 1 is positively driven by driving means 4 during application of the tread $b$ to the plies $n1$ and $n2$ on the drum. When the ends of the tread are joined together after a complete revolution of the drum, the drum is stopped and the tread ends are spliced together in accordance with conventional practice.

From the foregoing, it will be apparent that drum 1 facilitates both the building of and the transfer of breaker-tread assemblies whose constituent elements are arranged precisely with respect to one another and whose systems of internal strains are uniform, these features being obtained by the positive control that can be exerted over the various breaker plies and tread both during the winding of these parts on the drum and during the subsequent transfer of the breaker-tread assembly from the drum to the first stage carcass. The improved building drum 1, while being especially useful in connection with the fabrication of breaker-tread assemblies wherein metallic cords are utilized in the breaker plies, can also be advantageously employed in conjunction with the building of breaker plies involving non-metallic cords or cables therein. Accordingly, it is intended that the invention be considered to be applicable to non-metallic as well as to metallic cord breaker plies.

The transfer ring 5

Referring more particularly now to FIGS. 1, 2 and 6 through 8, the transfer ring 5 serves as a means for transporting the breaker-tread assembly formed on drum 1 to the first stage carcass carried on discs 10 and 11 of the tire shaping mechanism S. Transfer ring 5 includes the hereinbefore mentioned expansible and contractable ring 6 having the tread-like inner surface 7 formed therein.

The expansible and contractable ring 6 comprises a plurality of substantially identical, arcuate, radially movable elements or segments 5a, there being six such segments 5a in the present embodiment. When the segments 5a are joined together end-to-end in the manner shown in FIG. 6, they form a hollow cylinder, the axial cross-sectional profile of whose inner surface 7 corresponds in shape to the outer surface of the breaker-tread assembly that is to be transferred, as may be seen in FIG. 7. The segments 5a may be moved radially outward from the positions shown in FIG. 6 to expanded or outer positions at which the inner diameter of the expanded elements is greater than the maximum outer diameter of the breaker-tread assembly on the drum 1. When this is done, the transfer ring 5 may be freely moved axially from the position shown in FIG. 1 to a position in which its median plane is in alignment with the medium plane of drum 1, there being clearance between the outer extremities of the breaker-tread assembly on the drum and the interior portions of the inner ring 6.

The various segments 5a are moved between their radially inner and outer positions by means of a plurality of segment moving mechanisms or means identified at 5c in FIG. 6, there being one such mechanism for each segment 5a. The mechanisms 5c are somewhat similar to the segment moving mechanisms 1d employed in radially moving the segments of the collapsible drum 1 heretofore described. The mechanisms 5c are fixedly carried by an outer, generally cylindrical frame 5d radially outward of their corresponding segments 5a. Each segment moving mechanism 5c includes a group of four slides 5d, a group of four guides 5e in which the slides 5d move, a power cylinder 5f and a piston rod 5g movable in the power cylinder. Each piston rod 5g is connected by means of a coupling bar 5h to two identical single acting double cams or ramps 5i, and each of the slides 5d is equipped with a shaft 5j. At each end of each shaft 5j a roller 5k is provided, which rollers ride on and are actuated by the camming surfaces of the ramps 5i.

Each mechanism 5c is provided with two restoring springs 5n whose opposite ends are attached, respectively, to the frame 5b and to the corresponding segment 5a associated with the particular mechanism 5c. The springs 5n are positioned on the median plane of the ring 5 and are biased to move the segments 5a outwardly, so that the rollers 5k remain pressed against the camming surfaces of the ramps 5i.

The slides 5d associated with each segment 5a are fixedly attached to such segment and are lined up by twos in each of two planes which are parallel and symmetrical with respect to the median plane of the corresponding segment moving mechanism 5c, the median plane of each segment moving mechanism 5c being radially disposed with respect to the axis of the ring 5.

The guides 5e, on the other hand, are rigidly fixed to the frame 5b, as shown in FIG. 7, and the slides 5d move in their respective guides 5e in a reciprocating motion, parallel to the median planes of the individual segments 5a with which they are associated. Each guide 5e is provided with a pair of slots, one on each side of the guide, through which the opposite ends of the shafts 5j fixed to the slides 5d project and externally of which the shafts carry the rollers 5k. The cams or ramps 5i are each provided with the profiles illustrated in FIGS. 1 and 7. Thus, when the piston rods 5g of the various power cylinders 5f are all extended outwardly to the position shown in FIG. 7, the segments 5a all move radially inward against the bias of the springs 5n to the positions shown in FIG. 7. On the other hand, when the piston rods 5g are retracted into the various power cylinders 5f, the segments 5a all move to their radially outer positions because the springs 5n cause the rollers 5k to follow the profiles of the ramps 5i.

As in the case of building drum 1, suitable known electrical and fluid control circuits may be provided which make it possible to obtain synchronization of the movements of the power cylinders 5f to move the segments 5a from their retracted to their expanded conditions and vice versa. In particular, limit switches, such as switches 5m (FIG. 6) which are actuated by the segments 5a are provided to sense the movement of the segments 5a and to control the admission of fluid under pressure into the power cylinders 5f. Also, suitable known control circuits may be employed to control and synchronize the translational movement along the common axis A—A of the transfer ring 5 under the influence of power cylinder 8 (FIG. 1).

The tire carcass shaping mechanism S

The tire carcass shaping mechanism S is illustrated in FIGS. 1, 2 and 9-18. Referring to these figures, the tire carcass supporting portion of the shaping mechanism S comprises the two aforementioned circular end plates or discs 10 and 11 which share the axis A—A in common with the drum 1 and the transfer ring 5 mentioned earlier herein. The edges of the discs 10 and 11 (FIG. 9) are provided with ferrules or shoulders 12 and 13 which cooperate with respective bead areas 14 and 15 (FIG. 13) of the first stage carcass 20 in supporting the carcass on the shaping mechanism S. The discs 10 and 11 also include respective grooves 16 and 17 in which are carried respective annular sealing rings 18 and 19 of a flexible elastic material, such as rubber. The sealing rings 18 and 19 engage the inner portions of the bead areas 14 and 15 of the first stage carcass 20 when a carcass 20 is mounted on the discs 10 and 11.

The arrangement is such as to provide a seal between the bead areas 14 and 15 of the carcass 20 and the discs 10 and 11 of the shaping mechanism S to facilitate direct inflation of the carcass, regardless of slight irregularities in the shape of the carcass. The discs 10 and 11 are axially relatively movable with respect to one another to accommodate different size carcasses 20, to sealingly cooperate with the carcasses during inflation of the latter and to facilitate the shaping of first stage carcasses into second stage carcasses.

The relative axial movement of the discs 10 and 11 along the axis A—A is obtained preferably by mounting the disc 11 on a shaft 21 and by mounting the disc 10 on a sleeve 22 which is splined on and axially slidable relative to the shaft 21. The relative motions of the shaft 21 and sleeve 22 may be obtained by the use of appropriate driving means of known type.

The shaft 21 is provided with an axial conduit or pipe line 23 therein which is connected with a source of fluid under pressure, for example compressed air. The flow of the pressure fluid is controlled in a known manner in accordance with the needs of the shaping operation. Conduit 23 discharges into the chamber formed by the first stage carcass 20 and discs 10 and 11 (see FIG. 13) by means of a radially disposed passageway 24 which interconnects the conduit 23 with such chamber.

The sidewall shaping portion of the tire carcass shaping mechanism S comprises two axially movable, conical shaping rings 25 and 26 (FIG. 1) which are coaxial and symmetrical with respect to the plane M—M perpendicular to their common axis A—A and are placed one on each outboard side of the carcass support discs 10 and 11. The rings 25 and 26, in addition to shaping the carcass 20 during inflation of the latter and forcing the shoulder areas of the carcass into good contact with the shoulder areas of the breaker-tread assembly, serve to clamp the bead areas 14 and 15 tightly against the discs 10 and 11 (see FIG. 16) to aid in sealing the carcass to the discs.

The rings 25 and 26 have respective inner faces 27 and 28 which are provided with the hereinbefore mentioned conical contours that correspond to the shape it is desired to impart to the sidewalls of the first stage carcass during processing of same in the machine. The rings 25 and 26 are axially relatively movable by suitable known power cylinder or drive screw mechanisms (not shown) toward and away from one another, first moving toward the discs 10 and 11 which constitute the first stage tire carcass support and then moving together with these discs in connection with the shaping of the carcass. The rings 25 and 26 are carried by sleeves 29 and 30 (see FIG. 17) coaxial with the axis A—A, sleeve 29 sliding on the sleeve 21 and the sleeve 30 being slidable within a cylindrical guide 31 fixedly carried internally of building drum 1.

Operation of the machine

The manner in which a first stage tire carcass has a breaker-tread assembly attached thereto and is shaped to a second stage tire carcass has been synoptically illustrated in FIGS. 11 through 18. Referring to FIG. 11, a breaker-tread assembly, comprising the breaker plies n1 and n2 and the tread b, is built up on the grooved outer surface 2 of the drum 1 in the manner described hereinbefore. When the assembly has been built up on drum 1, the transfer ring 5, which theretofore had been at the rest position shown in FIG. 11, is moved into radial alignment with the breaker-tread assembly on the drum 1, taking the position shown in FIG. 12. It will be noted that the expansible and contractable ring 6 of transfer ring 5 is in its radially expanded condition in order to clear the breaker-tread assembly during the movement of the transfer ring 5 into overlapping relationship with the breaker-tread assembly.

Concurrently with the moving of the transfer-ring 5 into alignment with the building drum 1, the operator of the machine would be placing a first stage carcass 20 on the end discs 10 and 11 of the tire shaping mechanism S, as also shown in FIG. 12. Thereafter, the first stage tire carcass 20 will be sealingly engaged by the discs 10 and 11, which move apart during an operation which occurs at substantially the same time as the following operation involving the transfer of the breaker-tread assembly from the building drum 1 to the transfer ring 5.

When the transfer ring 5 reaches the position shown in FIG. 12, the segments of the ring 6 are actuated to move to their radially inner position, causing the inner surface 7 of the ring 6 to come into contact with the outer surface of the tread b on drum 1, as shown in FIG. 13. Also, the end discs 10 and 11 move outwardly to engage the bead areas 14 and 15 of the first stage tire carcass 20 in the tire shaping mechanisms S.

When the ring 6 is in contact with tread b, the segments of the building drum 1 are caused to radially contract to the position shown in FIG. 14, freeing the breaker-tread assembly from the building drum 1 and completing the transfer of the breaker-tread assembly from the drum to the transfer ring 5. It should be pointed out at this time that the magnetic force exerted by the magnetic flexible material incorporated in the outer surface 2 of the building drum 1, although sufficient to hold the breaker in place during the building of the breaker-tread assembly, is insufficient to interfere with the transfer of the breaker-tread assembly from the contracting drum to the transfer ring.

When the drum 1 has been fully contracted, and the first stage carcass 20 and the end discs 10 and 11 are in sealing engagement, the transfer ring 5 is shifted axially from the building drum toward the end discs 10 and 11, ending up at the position shown in FIG. 15. In this position the median plane of the breaker-tread assemby is aligned with the median plane M—M of the tire shaping mechanism S.

When transfer ring 5 reaches the position shown in FIG. 15, the shaping rings 25 and 26 are moved axially toward the discs 10 and 11 to assist in sealing the bead areas of the carcass 20 against the sealing rings 18 and 19 (FIG. 9) of the discs. When contact is established, a concurrent movement toward median plane M—M by the shaping rings 25 and 26 and the discs 10 and 11 begins, and compressed air is concurrently introduced into the interior of the chamber formed between the discs 10 and 11 and the carcass 20 by means of the conduit 23. Accordingly, the first stage carcass 20 begins to inflate while the discs 10 and 11 move toward one another. During this inflation, the shaping rings 25 and 26 cause the sidewalls of the carcass 20 to assume prescribed contours. The end point of this movement and inflation is shown in FIG. 16.

The foregoing approaching movement of the discs 10 and 11 during inflation of the carcass 20 is symmetrical with respect to the median plane M—M. It continues until the distance between the disc reaches a predetermined value dependent upon the dimensions of the tire casing being built, for example the distance shown in FIG. 16. During this movement and inflation, the outer surface of the carcass is forced under pressure against the inner walls 27 and 28 of the shaping rings 25 and 26, assuming the shape of these walls. It is also forced under pressure against the inner surface of the breaker-tread assembly that is being held by the transfer ring 5. The latter causes the outer surface of the carcass 20 and the inner surface of the breaker-tread assembly to adhere to one another, the adherence of the shoulder portions of the carcass 20 to the shoulder portions of the breaker-tread assembly being particularly enhanced by the action of the shaping rings 25 and 26 pressing against the sidewalls of the inflated carcass.

Once the breaker-tread assembly is adhered to the carcass 20, the ring 6 is radially expanded to the position shown in FIG. 17, freeing it from the breaker-tread assembly on the carcass, which carcass is now a second stage carcass. Thereafter, the transfer ring 5 is shifted axially away from the second stage carcass 20, as shown in FIG. 18, and is moved to the position it occupied at the start of the cycle, shown in FIG. 11. The shaping rings 25 and 26 are also moved back at this time to the positions they occupied at the start of the cycle, shown in FIG. 11, and the breaker-tread assembly on carcass 20 is then stitched by a conventional roller stitching mechanism (not shown) to cause greater adherence of the breaker-tread assembly to the carcass. Upon completion of the stitching operation, the pressure within the carcass 20 is released and then the discs 10 and 11 are moved toward one another to facilitate removal of the second stage carcass therefrom.

During the return of the transfer ring 5 and shaping rings 25 and 26 to their rest positions, and during the stitching operation, the building drum 1 may be employed in building a new breaker-tread assembly, as shown in FIG. 18. Accordingly, when the completed second stage carcass 20 has been removed from the shaping mechanism S and the new breaker-tread assembly has been prepared on building drum 1, the machine is back to the condition illustrated in FIG. 11, ready to institute a new operating cycle.

It will be understood by those skilled in the art that suitable conventional electrical and fluid circuits would be employed in the foregoing tire building machine to automatically or manually regulate the various movements of the various parts of the machine as well as to synchronize the operations of the various components of the machine with respect to one another.

While particular embodiments of this invention have been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described the invention, what is claimed as new and desired to be secured by Letters Patent of the United States is:

1. A tire building drum for receiving a ply of rubber having a magnetically attractable material incorporated therein, said drum having magnetized, cured rubber on an outer cylindrical building surface thereof, said magnetized, cured rubber being arranged in at least a plurality of locations distributed throughout at least the medial region of said cylindrical surface co-extensive with at least a major portion of the projected area of the ply to be applied to said drum for maintaining proper alignment of said ply with said drum by magnetic attraction exerted on said ply during application of said ply to said drum.

2. A drum as described in claim 1, said magnetized, cured rubber extending circumferentially of said drum to a greater extent than it does axially thereof.

3. A drum as described in claim 1, said magnetized cured rubber extending circumferentially about the entire drum.

4. Apparatus as described in claim 1, said outer surface of said drum being provided with at least one circumferential groove, and said magnetized, cured rubber being embedded in said groove.

5. Apparatus as described in claim 4, said groove and said magnetized, cured rubber extending circumferentially about the entire said drum.

6. Apparatus as described in claim 4, said outer surface of said drum being provided with a plurality of grooves extending circumferentially about the entire said drum, each of said grooves being substantially filled with magnetized, cured rubber.

7. Apparatus as described in claim 1, said drum comprising a plurality of circumferentially arranged arcuate segments, a hub member and means carried by said hub member and connected to said segments for contracting and expanding said drum, said segments forming a substantially continuous cylindrical outer surface when said drum is in its expanded condition.

8. Apparatus as described in claim 7, and further including shaft means, means for rotatably supporting said hub member on said shaft means, and motor means coupled to said hub member for rotating said drum about said shaft means.

9. Apparatus as described in claim 7, said magnetized, cured rubber being positioned on the outer surfaces of each said segments.

10. Apparatus as described in claim 9, said outer surface of each segment being provided with a plurality of circumferentially extending grooves, said magnetized, cured rubber being embedded in substantially filling each of said grooves.

11. Apparatus as described in claim 8, said outer surface of each of said segments being provided with a plurality of circumferentially extending grooves, said magnetized cured rubber being embedded in and substantially filling each of said grooves.

References Cited
UNITED STATES PATENTS

| | | | |
|---|---|---|---|
| 2,988,131 | 6/1961 | Frohlich et al. | 156—405 |
| 3,191,106 | 6/1965 | Baermann | 18—Dig. 33 |
| 2,699,198 | 1/1955 | Balzhiser | 156—417 X |
| 3,140,216 | 7/1964 | Shilts et al. | 156—417 |
| 3,332,820 | 7/1967 | Porter | 156—399 |
| 3,120,047 | 2/1964 | Crom | 18—Dig. 33 |

STEPHEN C. BENTLEY, Primary Examiner